(12) United States Patent
Krishnamurthi et al.

(10) Patent No.: US 11,700,278 B2
(45) Date of Patent: Jul. 11, 2023

(54) ACCESS MANAGEMENT SYSTEM WITH A MULTI-ENVIRONMENT POLICY

(71) Applicant: MICROSOFT TECHNOLOGY LICENSING, LLC, Redmond, WA (US)

(72) Inventors: Bhuvaneshwari Krishnamurthi, Redmond, WA (US); Janani Vasudevan, Boulder, CO (US); Harsha Vardhan Sanagaram, Bothell, WA (US); Corbin C. Rogerson, Bellevue, WA (US); Sandeep Kalarickal, Kirkland, WA (US); Kahren Tevosyan, Kirkland, WA (US); Thomas Charles Knudson, Draper, UT (US)

(73) Assignee: Microsoft Technology Licensing, LLC

( * ) Notice: Subject to any disclaimer, the term of this patent is extended or adjusted under 35 U.S.C. 154(b) by 609 days.

(21) Appl. No.: 16/458,173

(22) Filed: Jun. 30, 2019

(65) Prior Publication Data
US 2020/0412765 A1    Dec. 31, 2020

(51) Int. Cl.
*H04L 9/40*        (2022.01)
*G06Q 30/018*    (2023.01)

(52) U.S. Cl.
CPC .......... *H04L 63/20* (2013.01); *H04L 63/104* (2013.01); *G06Q 30/018* (2013.01)

(58) Field of Classification Search
CPC ..... H04L 63/20; H04L 63/104; H04L 63/102; H04L 63/108; G06Q 30/018;
(Continued)

(56) References Cited

U.S. PATENT DOCUMENTS 7,496,191 B1 * 2/2009 Crews ................. G06F 21/6218
                                                       379/142.05
9,083,749 B1 * 7/2015 Roth ....................... H04L 63/10
(Continued)

FOREIGN PATENT DOCUMENTS

EP           2585970 A2      5/2013

OTHER PUBLICATIONS

Xin Pei et al., "Achieving Efficient Access Control via XACML Policy in Cloud Computing," 2015, pp. 1-6. (Year: 2015).*
(Continued)

*Primary Examiner* — Luu T Pham
*Assistant Examiner* — Canh Le
(74) *Attorney, Agent, or Firm* — Shook, Hardy & Bacon L.L.P.

(57) ABSTRACT

Methods, systems, and computer storage media for providing access to computing environments based on a multi-environment policy are provided. The a multi-environment policy is configurable to define rules that have provider-controlled and customer-controlled computing environment parameters for approving access to provider-controlled computing environments and customer-controlled computing environments. In operation, a request associated a computing environment are received. The computing environment is associated with a multi-environment policy. The multi-environment policy is configurable to define the rules based on access vectors having grouped computing environment aspects for control and visibility associated with accessing computing environments. Based on the request, a determination whether the request is for a provider-controlled or a customer-controlled computing environment is made. Based on the multi-environment policy, approval-request parameters of an approval-request are communicated to receive approval-request response values. And, based on receiving
(Continued)

the approval-request response values, a request response indicating approval or denial of the request is communicated.

20 Claims, 8 Drawing Sheets

(58) Field of Classification Search
CPC ..... G06F 2221/2137; G06F 2221/2141; G06F 21/6218
See application file for complete search history.

(56) References Cited

U.S. PATENT DOCUMENTS

| | | | | |
|---|---|---|---|---|
| 9,854,001 | B1* | 12/2017 | Roth | H04L 63/20 |
| 10,025,813 | B1* | 7/2018 | Gebremariam | G06F 7/02 |
| 2006/0248323 | A1* | 11/2006 | Ewing | G06F 9/44505 |
| | | | | 713/1 |
| 2014/0181448 | A1* | 6/2014 | Buchholz | G06F 3/0604 |
| | | | | 711/163 |
| 2016/0156671 | A1 | 6/2016 | Cabrera et al. | |
| 2017/0244723 | A1* | 8/2017 | Prasad | G06F 9/5072 |
| 2017/0364345 | A1 | 12/2017 | Fontoura et al. | |
| 2018/0227369 | A1* | 8/2018 | DuCray | H04L 12/403 |
| 2018/0316676 | A1* | 11/2018 | Gilpin | H04L 63/20 |
| 2019/0068627 | A1* | 2/2019 | Thampy | G06N 20/20 |
| 2020/0004589 | A1* | 1/2020 | Geiger | H04L 41/0823 |
| 2020/0045083 | A1* | 2/2020 | Prasad | H04L 63/107 |
| 2020/0074520 | A1* | 3/2020 | Bermudez | G06Q 30/0226 |
| 2020/0159945 | A1* | 5/2020 | Taylor | H04L 9/30 |

OTHER PUBLICATIONS

Giorgos Kappes et al., "Multitenant Access Control for Cloud-Aware Distributed Filesystems," 2017, pp. 1071-1085. (Year: 2017).*

"International Search Report and Written Opinion Issued in PCT Application No. PCT/US20/031971", dated Jul. 3, 2020, 13 Pages.

* cited by examiner

ACCESS MANAGEMENT SYSTEM WITH A MULTI-ENVIRONMENT POLICY

BACKGROUND

Users often rely on computing resources such as applications and services to perform various computing tasks. Distributed computing environments can support building, deploying, and managing applications and services. Users and enterprises are moving away from traditional computing environments to run their applications and services on distributed computing environments. Distributed computing environments implement security mechanisms (e.g., access management systems) to ensure the security of different types of computing resources in the distributed computing environments. As distributed computing environments increasingly support applications and services, providing both improved secure provisioning of access to computing resources and data security in distributed computing environments is important.

SUMMARY

Various aspects of the technology described herein are generally directed to systems, methods, and computer storage media, for among other things, providing access management for access to distributed computing environments (e.g., access-controlled computing environments) based on a multi-environment policy defined in an access management system. In particular, a multi-environment policy is configurable to define rules having provider-controlled computing environment parameters ("provider parameters") and customer-controlled computing environment parameters ("customer parameters") for approving access to provider-controlled computing environments and customer-controlled computing environment. In this regard, control refers to control over approval to access a computing environment with customer data.

By way of background, a customer (i.e., tenant) of a distributed computing environment may utilize various computing resources in an access-controlled computing environment ("computing environment") of the distributed computing environment. The computing resources may malfunction, thus requiring repair, troubleshooting, replacement, or updates (i.e., "support operations"). For example, the computing environment may have a virtual machine (VM) that malfunctions and becomes inaccessible because of a failed component in the VM, and an admin (e.g., software engineer, support personnel) of the distributed computing environment provider ("provider") needs access to perform support operations to restore functionality. The admin can request access using an access management system (e.g., Just-In-Time "JIT" system) that provisions access to the computing environment. In particular, the access management system may provide temporary access (i.e., time-limited controlled access) to the computing environment to diagnose and repair the malfunctioning VM.

Conventional access management systems have typically been implemented with a lack of operational features for external-customer computing environments, with limited control and visibility to external-customers, and without consideration for comprehensive management of different types of computing environments of a provider ecosystem. By way of context, customarily (and historically), access management systems for computing environments have been developed for internal resources (e.g., internal-customers of the provider) and thus, such access management systems and environments were developed without emphasis on external-customer computing environments or operational expectations. As such, an alternative approach for providing an access management system that can provide access to admins to different types of computing environments would improve computing operations for more secure and efficient access provisioning operations.

Aspects of the technical solution described in the present disclosure are directed towards improving access management based on a multi-environment policy that is configurable to define rules for performing access provisioning operations. The rules have provider parameters and customer parameters for approving access to provider-controlled computing environments and customer-controlled computing environment. In this regard, control refers to control over approval to access a computing environment with customer data. The computing environment parameters in the multi-environment policy are based on computing environment aspects of the computing environments. The rules of the multi-environment policy are defined based on access vectors having grouped computing environment aspects for control and visibility associated with accessing computing environments. The computing environments can be associated with computing environment aspects categorized as computing environments attributes, access provisioning operations, support administrator operations of the provider-controlled or customer-controlled computing environments. In this way, a support admin receives access to computing environments subject to the multi-environment policy. As such, access management provides managed control and visibility functionality for integrated access management for different types of computing environments of a provider based on the multi-environment policy.

In operation, request values, of a request associated a computing environment, are received. The computing environment is associated with a multi-environment policy. The multi-environment policy is configurable to define rules for approving access to provider-controlled computing environments and customer-controlled computing environments. The rules are defined based on access vectors having grouped computing environment aspects for control and visibility associated with accessing computing environments. Based on the request values, a determination whether the request is for a provider-controlled computing environment or a customer-controlled computing environment is made. The request values are associated with the multi-environment policy. Based on the multi-environment policy, approval-request parameters of an approval-request are communicated to receive approval-request response values. The approval-request parameters are associated with the customer-controlled computing environment. The approval-request parameters are selected based on the access vectors. The approval-request response values for the approval-request are received. And, based on receiving the approval-request response values, a request response indicating approval or denial of the request is communicated. Additional aspects of the technical solution are described below, by way of exemplary implementations, with reference to technical environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.+

BRIEF DESCRIPTION OF THE DRAWINGS

The technology described herein is described in detail below with reference to the attached drawing figures, wherein.

DETAILED DESCRIPTION

Figure 1A:
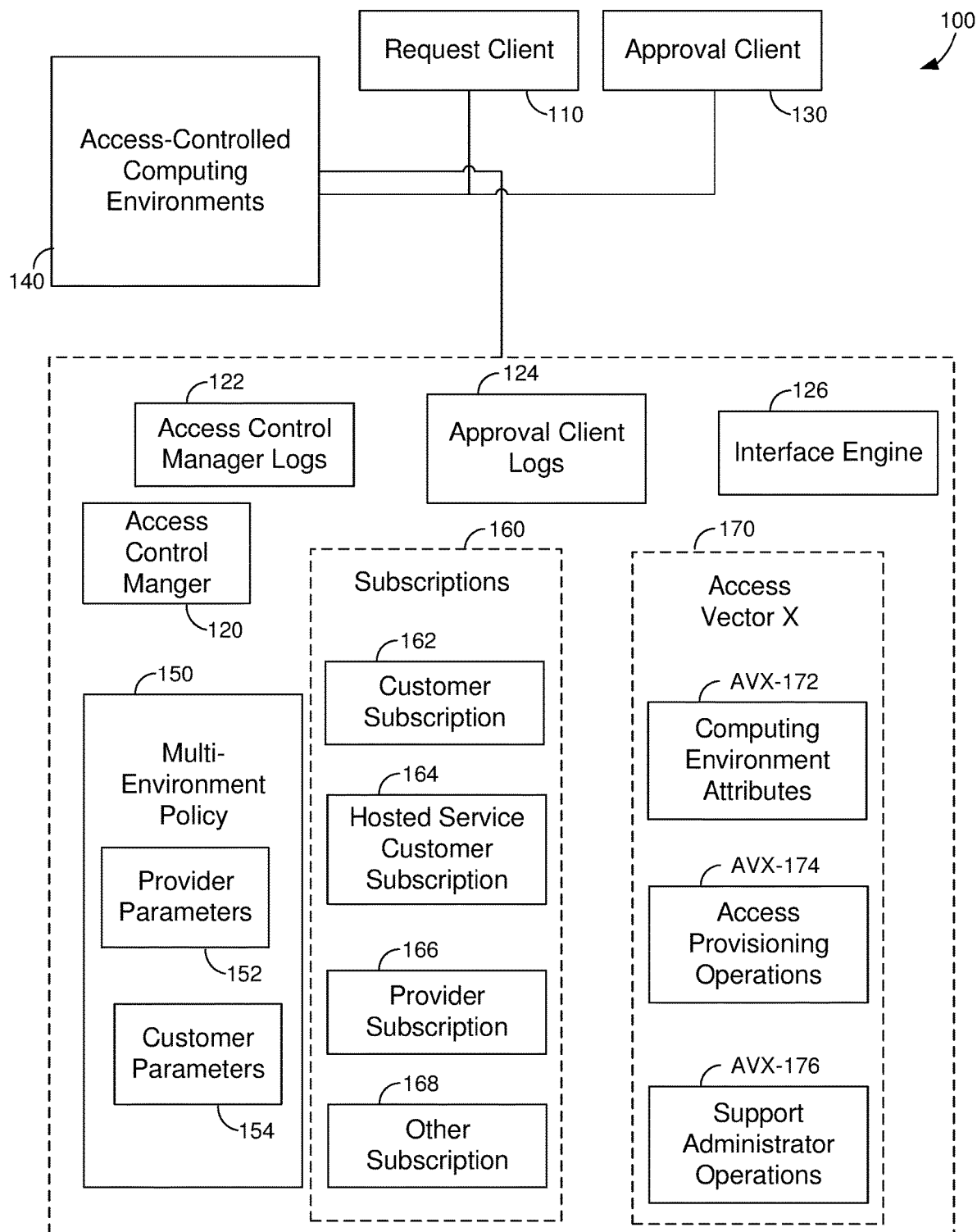
FIGS. 1A and 1B are block diagrams of an exemplary access management environment for providing access management operations using a multi-environment policy, suitable for use in implementing aspects of the technology described herein.

Overview of Aspects of the Technological Improvement

Distributed computing environments implement security mechanisms (e.g., access management systems) to ensure the security of different types of computing resources (e.g., computing access and secure user data) in the distributed computing environments. For example, customers in highly regulated industries (e.g., finance, healthcare, utilities, and government) have to meet regulatory and compliance requirements, which require controls, audits, and restricted access to sensitive data. In addition, customers use the distributed computing environments in a variety of different service models (e.g., SaaS, PaaS, IaaS) and deployments models (private, public, hybrid, and community). Security concerns in distributed computing environments can broadly belong to two categories: provider concerns and customer concerns, and the provider must ensure that their infrastructure is secure and that computing resources and data are protected, with appropriate responsibility attributable or communicated to the customer to compliment provider security mechanisms.

By way of background, a customer (i.e., tenant) of a distributed computing environment may utilize various computing resources in an access-controlled computing environment ("computing environment") of the distributed computing environment. The computing resources may malfunction, thus requiring repair, troubleshooting, replacement, or updates (i.e., "support operations"). For example, the computing environment may have a virtual machine (VM) that malfunctions and becomes inaccessible because of a failed component in the VM, and an admin (e.g., software engineer, support personnel) of the distributed computing environment provider ("provider") needs access to perform support operations to restore functionality. The admin can request access using an access management system (e.g., Just-In-Time "JIT" system) that provisions access to the computing environment. In particular, the access management system may provide temporary access (i.e., time-limited controlled access) to the computing environment to diagnose and repair the malfunctioning VM.

Conventional access management systems have typically been implemented with a lack of operational features for external-customer computing environments, with limited control and visibility to external-customers, and without consideration for comprehensive management of different types of computing environments of a provider ecosystem. By way of context, customarily (and historically), access management systems for computing environments have been developed for internal resources (e.g., internal-customers of the provider) and thus, such access management systems and environments were developed without emphasis on external-customer computing environments or operational expectations. For example, external-customers (unlike internal-customers) can have sensitive customer data that should not be made available to unapproved persons, as such access management systems would have to include support for situations where customer data needs to remain inaccessible or support operations impact on customer data is communicated to the customer. Moreover, the provider may offer different subscriptions types for supporting computing environments (e.g., Hosted-On-Behalf-Of computing environments) where the computing environment may include the provider and the customer having shared responsibility for the computing environment. As such, access to such computing environments may have to be processed differently.

And, simply adding external-customers to an existing access management system without a comprehensive approach that considers internal and external aspects in the solution would not operate efficiently. For example, it would be wasteful for a distributed computing environment to have two separate access management systems for internal and external customers. As such, further appropriate evaluation of requirements for different types of computing environments is needed for a viable integrated solution. In another example, current access management systems fail to account for implementation details or accommodate a variety of computing circumstances or scenarios (e.g., service models or deployment models) specifically faced by external-customers who unlike internal customers are not an inherent part of (or integrated with) the distributed computing environment system, workflows, or practices. As such, an alternative approach for providing an access management system that can provide access to admins to different types access-controlled computing environments would improve computing operations for more secure and efficient provisioning operations.

Embodiments of the present invention are directed to simple and efficient methods, systems, and computer storage media for providing access management based on a multi-environment policy that is configurable to define rules for performing access provisioning operations. In particular, a multi-environment policy is configurable to define rules having provider-controlled computing environment parameters ("provider parameters") and customer-controlled computing environment parameters ("customer parameters") for approving access to provider-controlled computing environments and customer-controlled computing environment. In this regard, control refers to control over approval to access a computing environment with customer data.

Figure 1B:
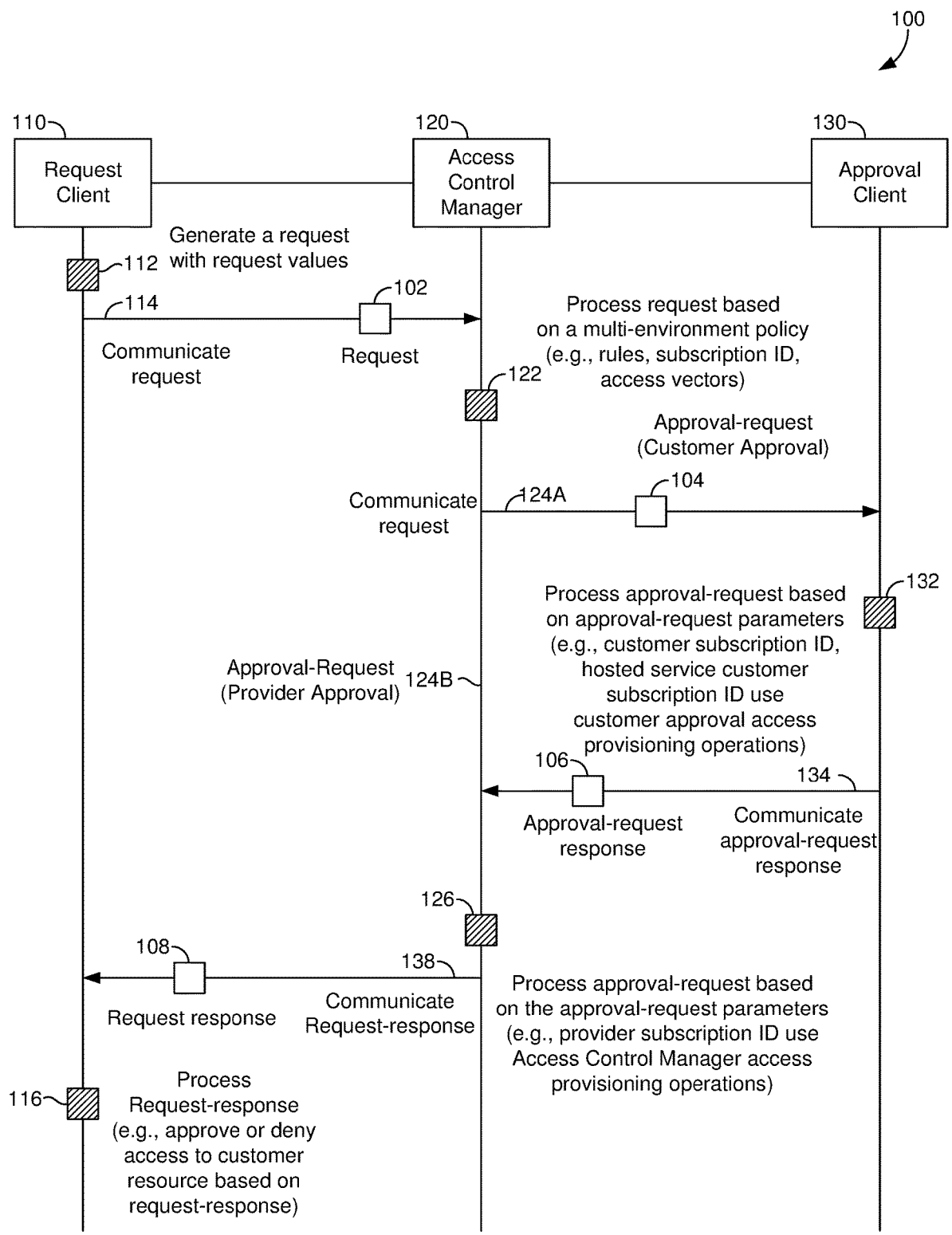
Figure 2:
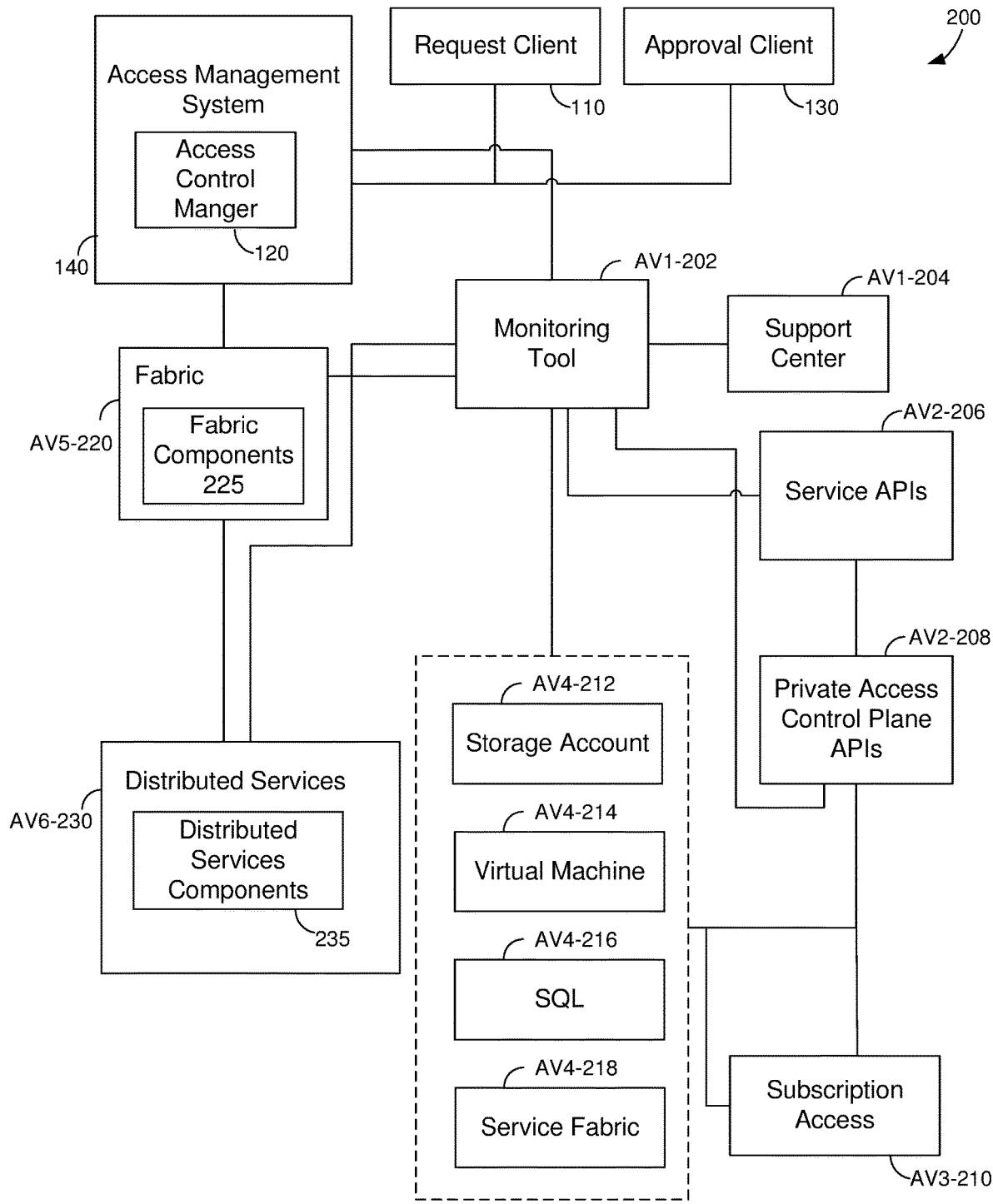
FIG. 2 is an exemplary access management environment in accordance with aspects of the technology described herein.

Overview of Example Environments for Providing Access to Computing Environments Based on a Multi-Environment Policy Aspects of the technical solution can be described by way of examples and with reference to FIG. 1A, FIG. 1B and FIG. 2. FIG. 1A, FIG. 1B and FIG. 2 are associated with an exemplary technical solution environment (access management environment 100) suitable for use in implementing embodiment of the technical solution. Generally the technical solution environment includes a technical solution system suitable for providing resource policy management using a pre-commit verification engine. With initial reference to FIG. 1A, FIG. 1A discloses access management environment 100 having request client 110, access control manager 120 (with access control manager logs 122, approval client logs 124, interface engine 126), approval client 130, access-controlled computing environments 140, multi-environment policy 150 (with provider parameters 152, customer parameters 154), subscriptions 160 (with customer subscription 163, hosted service customer subscription 164, provider subscription 166, other subscription 166) and access vector X (with computing environment attributes AVX-172, access provisioning operations AVX-174, and support administrator operations AVX-176).

At a high level, the rules have provider-controlled computing environment parameters ("provider parameters" 152) and customer-controlled computing environment parameters ("customer parameters" 154) for approving access to provider-controlled computing environments and customer-controlled computing environment (i.e., access-controlled environments 140). In this regard, control refers to control over approval to access a computing environment with customer data. The computing environment parameters in the multi-environment policy are based on computing environment aspects of the computing environments. The rules of the multi-environment policy are defined based on access vectors (e.g., access vector X 170) having grouped computing environment aspects for control and visibility associated with accessing computing environments. The computing environment can be associated with computing environment aspects (e.g., functional, physical, and operational features) categorized as computing environments attributes AVX-172, access provisioning operations AVX-174, support administrator operations AVX-1766 of the provider-controlled or customer-controlled computing environments. In this way, a support admin receives access to computing environments subject to the multi-environment policy 150. As such, the access management system provides managed control and visibility functionality for integrated access management for different types of environments of a provider based on the multi-environment policy.

The multi-environment policy 150 supports integrated multi-environment access control and visibility to access provisioning operations for access to computing environments of a distributed computing environment. The multi-environment policy 150 supports different types of computing environments by identifying access-controlled computing environments and corresponding rules, computing environment parameters, access vectors, and approval-request parameters. In particular, the multi-environment policy 150 can support provider-controlled environments and customer-controlled environments to provide control and visibility of access based on computing aspects of the computing environments. For example, the multi-environment policy 150 can support determining whether a computing environment is provider-controlled or customer-controlled such that the controlling entity and additional request values determine access provisioning operations to be performed to approve and grant requested access to a requestor, and visibility to the customer. For example, customer-controlled environments may follow different access provisioning operations from provider-controlled environments, and a dashboard accessible via the request client 110 or the approval client 130 can indicate the scope of access (e.g., customer container and service infrastructure features as defined in an access vector) to the customer.

The multi-environment policy 150 is configurable (e.g., using an access management interface) for different types of customers to define rules for performing access provisioning operations. The rules have provider parameters and customer parameters for approving access to provider-controlled computing environments and customer-controlled computing environment. For example, a rule may instruct an access control manager to determine a subscription type (e.g., subscription identifier) associated with the computing environment and then follow a defined set of access provisioning operations. In this way, the access control manager 120 may identify the subscription identifier (e.g., customer subscription identifier, hosted service customer subscription identifier, provider ("internal-customer") subscription identifier, and other subscription identifier), such that, based on the identified subscription identifier additional computing environment values may be determined and used for approving access to the computing environment.

Parameters (i.e., provider parameters 152 and customer parameters 154) are included in the multi-environment policy to provide appropriate control and visibility to the customers. For example, a hosted service customer subscription may not require as much control and visibility to access provisioning operations compared to a customer subscription (even though both require customer approval). As such, fewer or more parameters and access provisioning operations may be defined for approving access to a computing environment based on the corresponding subscription. In another example, for a customer subscription, access provisioning operations can include obtaining approval from the customer, while a provider subscription requires limited or no additional approval requirements from an internal-customer. As such, the request values provided in a request trigger different workflows defined in the multi-environment policy for providing access to the computing environment, as discussed in more detail below.

The rules of the multi-environment policy are defined based on access vectors (e.g., access vector X 170) having grouped computing environment aspects for control and visibility associated with access computing environments. The computing environments can be associated with computing environment aspects categorized as computing environments attributes, access provisioning operations, support administrator operations of the provider-controlled or customer-controlled computing environments. At a high level, an access vector can be a computing construct that groups computing environments aspects based on functional categories (e.g., standard development tools, service management plane, access interfaces, infrastructure components) of the distributed computing environment. For each functional category, the corresponding computing environment attributes, access provisioning operations, support administrator operations can be exposed and selectively implemented in the multi-environment policy. For example, an access vector may be for a subscription access interface or a direct access interface with corresponding computing environment attributes, access provisioning operations, and support administrator operations that are associated with the access vector.

Several different access vector implementations for control and visibility to access provisioning operations are possible once the access vectors are defined for computing environment aspects. For example, the support administrator operations can specifically identify the anticipated customer data impact (e.g., impact to customer data, exposure to customer data in storage, exposure to customer data in transit, exposure to customer data in-memory). For example, customer data impact may be associated with high, medium, and low impact indicators such that for a particular access vector, as such, the customer can quickly anticipate the type of data impact and make approval decisions accordingly. In another example, the support administrator operations may be geographically restricted such that the geographic location of the support administrator operations can be used as a factor when approving (or denying) access to a computing environment. For example, the multi-environment policy can include geographic-based approval parameters, where a customer approves support administrator operation only if the administrator is located in the United States or North America, for example. The different access vectors computing environment aspects may further include additional granularity in their impact on the computing environment or restrictions for accessing the computing environment.

Moreover, interfaces (e.g., via interface engine 126) defined based on the multi-environment policy and access vectors may visually provide for selective implementation of the grouped computing environment aspects of each access vector. The access vectors may be strictly enforced or flexibly enforced. Access vectors may be defined, refined, grouped, or regrouped such that a majority of access vectors limit access to customer data, in favor of grouping support operations in functional categories that provide limited or no access to customer data. In this regard, control and visibility are provided to the users (e.g., customer, administrators) associated with access provisioning operations. Other variations and combinations of access vectors implementations for control and visibility to access provisioning operations are contemplated with embodiments described herein.

Additionally, based on the multi-environment policy, an approval-request that includes approval-request parameters can be communicated to a customer to receive approval-request response values. The approval-request parameters are associated with the customer-controlled computing environment. For example, for a customer-controlled computing environment, the approval-request can identify one or more access vectors (e.g., infrastructure access vector for physical access to a drive), and grouped computing environment aspects (including the specific drive, date, time, name, and location of the admin, admin accessing the physical drive) associated the request to adequately inform the customer. In this way, the approval-request parameters are selected based on the access vectors and the approval-request response values for the approval-request can be received from the customer.

As mentioned, the access vectors may be strictly enforced or flexibly enforced such that the customer may approve, deny, or escalate the request (e.g., ask for additional information). And, whether approved, denied, or escalated, an access management interface may provide an interface to provide visibility to the access provisioning operations (e.g., a dashboard having GUI elements based on the access vectors). For example, a customer may approve access associated with a standard development tools access vector, and have limited concerns for support operations having access to customer data because the standard development tools access vector is defined and disclosed to the customer as having limited or no access to customer data. Conversely, with approved access to a service management plane access vector, the service management plane access vector identifies APIs, containers, and customer data that are accessible. In this regard, the customer is informed of the service management plane access and the implications of the approved access and support operations. Moreover, based on approving access, the approval client may track and expose support operations that are implemented to an access management interface (e.g., activity monitor). As such, access management system provides managed control and visibility functionality for integrated access management for different types of environments of a provider ecosystem based on the multi-environment policy.

Turning to FIG. 1B, FIG. 1B includes the access management environment 100 having a request client 110, an access control manager 120, an approval client 130. At step 112, the request client 110 generates a request (with request values based on request parameters) for access to an access-controlled computing environment (e.g., provider-controlled or customer-controlled computing environment). The request client 110 may include an access management interface that supports both receiving the request values for the request, based on request parameters, and as an initial operation receiving policy values for multi-environment policy based on policy parameters.

With initial reference to operations for receiving policy values for the multi-environment policy, the request client 110 is configured to receive values of policy parameters of the multi-environment policy. The policy parameters are based on rules that are configured based on access vectors. The access management interface can communicate the policy values to cause generation and storage of the multi-environment policy. The multi-environment policy is implemented based on request values of requests for access to computing environments. With reference to receiving request values, the request client 110 is configured to receive the request for access to the computing environment based on request parameters. The request parameters are used in rules of the multi-environment policy. For example, the access management interface includes graphical user interface elements associated with the access vectors of the computing environments.

At step 114, the request 102 having request values is communicated to access control manager 120. The computing environment of the request is associated with a multi-environment policy. The access control manager includes programmed instructions that define integrated access provisioning operations for combined provisioning of access to provider-controlled computing environments and customer-controlled computing environment. The integrated access provisioning operations are based on a subscription classification that identifies a controlling subscriber of an identified computing environment. In one example, the subscription classification (and control) is determined based on subscription identifier (e.g., a customer subscription identifier, hosted service customer subscription identifier, provider (internal-customer) subscription identifier).

At step 122, the access control manager 120 accesses a multi-environment policy associated with the request and corresponding computing environment. The access control manager 120 may include, have access to, or maintain a store, of the multi-environment policy that is implemented to process access requests. For example, based on the request values, the access control manager 120 determines whether the request is for a provider-controlled computing environment or a customer-controlled computing environment, where the request values are associated with the multi-environment policy. Additional operations can be performed to process the request 102.

At step 124A, based on the multi-environment policy, an approval-request 104 (based on the request 102) is communicated to the approval client 130. The access control manager 120 can communicate approval-request parameters of the approval-request to receive approval-request response values. In particular, when the request is associated with a customer subscription ID or host service customer subscription ID, the approval approval-request parameters are associated with a customer-controlled computing environment. The approval-request parameters are selected based on the access vectors. At step 124B, based on the multi-environment policy, the access control manager may approve the request based on provider approval-parameters and provider-approval values. Operationally, the access control manager 120 has access to provider approval values or may request (e.g., approval-request provider approval) from a provider resource to approve the request. The provider in this case is an internal-customer or predefined construct that is managed with limited or no visibility to access provisioning operations. At step 126, the approval request is processed based on the approval-request parameters (e.g., provider subscription ID).

At step 132, the approval client 130 receives and processes the approval-request 104 having approval-request parameters. Processing the request is based approval-request (customer approval) parameters and approval-response values received from the customer. For example, the approval response values include a value indicating a request additional for human intervention for overriding one or more approval-request parameters. In addition, at step 132, a graphical user interface for monitoring access provisioning operations based on the grouped computing environment aspects for control and visibility associated with accessing the computing environments may be generated. The grouped computing environment aspects explicitly expose a security boundary construct based on enumerated values of the grouped computing environment aspects to support informed and isolated access approval. For example, an access vector includes a tag indicating a type of access to customer data associated with the access vector. Other variations and combinations of a security boundary constructs based on grouped computing environment aspects are contemplated with embodiments described herein.

At step 134, the approval request response 126 having the approval request response values 106 is communicated to the access control manager 120. The approval request response values are communicated such that access control manager 120 can complete process of the request. The approval request values may, for example, include a first value to approve or deny the approval-request; a second value to selectively reduce or expand the scope of the approval request; a third value indicating a request additional for human intervention for identifying values for one or more approval-request parameters. Additionally, another graphical user interface for monitoring requests based on the grouped computing environment aspects for control and visibility associated with accessing computing environments may be generated.

At step 138, the request response 108 having one or more approval-request response values is communicated to the request client 110. The request response can indicate approval or denial of access to the computing environment. The request client 110 may use the request response 108 to gain access to the computing environment if access is approved or perform remedial operations if approval is denied.

Aspects of the technical solution of this disclosure have been described with reference to several inventive features and advantages associated with access management of access to computing environments based on a multi-environment policy. In particular, access provisioning operations of an access management system provides managed control and visibility functionality for integrated access management for different types of computing environments of a provider based on the multi-environment policy. Overall, the a practical application of aspects of the technical solution described results in improvements based on less CPU computation, smaller memory requirements, and increased flexibility in file systems.

Turning to FIG. 2, the access management environment 200 includes the request client 110, access control manager 120, approval client 130, and access management system 140. The access management environment 200 is an operating environment that provides access management resources (e.g., an access control manager and access management interfaces) for access management for computing environments based on a multi-environment policy that is configurable to define rules for performing access provisioning operations. Access provisioning operations can be provided for provider-controlled computing environments and customer-controlled computing environments, where control refers to control over approval of access to the computing environment. The access management environment 200 provides a generic solution that operates with different computing environments (e.g., VMs, service models, and deployment models). A support admin may request elevated permissions that lead to access to customer data that is stored differently in different computing environments.

In one example implementation, a subscription identifier for a hosted service customer subscription is processed differently from a provider subscription. A hosted service customer subscription identifier can be associated with a customer-controlled computing environment (i.e., a computing environment where the customer controls and manages access to the computing environment having customer data) but with the provider of the distributed computing environment supporting the resources in the computing environment. Operationally the computing environment can include a hosted service (e.g., hosted-on-behalf-of service model) where the hosted service is deployed to a VM that belongs to the provider of the distributed computing environment. The VM can be associated with the provider (internal customer) hosting the customer resources and customer data. An application gateway and virtual private network (VPN) gateway may provide access to the customer resources and VM.

An admin may require access to VMs with hosting services for troubleshooting purposes and the access provisioning operations (as described herein) can be implemented as a requirement for the customer to approve access to VMs running hosting services. In particular, when an application and VPN gateway exists for a hosted service, while the gateway VM might reside on a provider-hosting environment, the customer can still control the computing environment to approve access, such that explicit customer approval is required for access. A request can include several values for request parameters including (1) Remote Desktop using subscription ID, HostedService, Role; (2) Remote Desktop using Cluster, NodeID, ContainerID; Remote Desktop using Cluster, Tenant, Role; and (4) Virtual Machine Scale Sets.

Other variations and combinations of request parameters are contemplated with embodiments described herein.

In operation, the access control manager 120 receives the request and determines a hosted customer subscription identifier that indicates that the computing environment is controlled by the customer and not the provider for approving access. The access control manager 120 determines access provisioning operations based on whether the subscription identifier indicates customer control or provider control. For example, a subscription classification that identifies general computing environment aspects of a computing environment can specifically identify a controlling subscriber of an identified computing environment.

The access control manager 120 forwards an approval-request to the customer when the subscription identifier is associated with customer control. For example, when the access control manager 120 identifies a subscription, determines that the subscription identifier is associated with an application/VPN gateway, determines that the subscription is marked hosted-on-behalf-of, and the subscription identifier is not for a provider (internal-customer), then access control manager 102 requests customer approval. Determining that the subscription identifier is not for a provider can be based on a predefined query that retrieves a deployment ID using the request values, the deployment ID indicates whether the subscription ID and whether the computing environment is provider-controlled or customer-controlled.

In another example, the customer subscription identifier can be associated with a customer-controlled computing environment (i.e., a computing environment where the customer controls and manages access to a computing environment having customer data). In this regard, a control configuration of a computing environment corresponds to the subscription classification. For customer-controlled computing environments, the "controller" identified in subscription control configuration needs to provide approval for support operations to be performed.

The access management system 140 may access a subscription identifier of a computing environment to determine access provisioning operations for the computing environment based on the subscription control configuration (e.g., controlling subscriber). For example, when the subscription identifier is not for a provider-controlled computing environment, approval-request of the request is forwarded to the approval client 130 to receive approval from the customer. The access control manager 120 can include code that accesses a multi-environment policy and determines the subscription identifier associated with a computing environment. Once the approval-request is sent to the approval client, the customer can approve or deny the approval-request and thus the corresponding request. After the customer has taken an action, the access control manager 120 can reflect the update status of the request.

The access management system 140 may also support defining and managing the grouped computing environment aspects that explicitly expose a security boundary construct based on enumerated values of the grouped computing environment aspects to support informed and isolated access approval. For example, support operations (e.g., platform services, service infrastructure) can be defined differently from customer operations (e.g., customer services, customer container) and more particular differently for each access vector. In other words, access to the computing environment can be designed in such a way that support operations have limited or no access to customer data as shown in Table 1. As such, for a particular approval for access based on a selected access vector, the customer is able to control and see the support operations that are approved for the access vector. As such, approving access to the computing environments can be associated only with support operations that expose or impact the customer services and not customer data (in some scenarios).

TABLE 1

| Service Name | Customer Container | Service Infrastructure |
| --- | --- | --- |
| Azure Compute | Customer VM | Host OS, Fabric Node, etc. |
| Azure Storage | Customer Storage Account | Storage Stamp, Disk, etc. |
| Azure SQL | Customer SQL DB | SF Control/Tenant Ring, Cloud Service, etc. |

The access management systems also enables access auditing based on logs in the access control manager 120. Customers, who are interested, can know when, who and for what reasons support admins attempted to access their computing environments and what took place as part of that access. The access control manager 120 includes the ability to collect access information via the logs which includes the following information: (1) What is the support ticket # under which this access is being request? (2) Who has requested access? (3) What date/time the access request was initiated? (4) What is the justification for the access? (5) How long the access lasted? Additionally, the approval client may receive logs based on an approved request in an activity log section of the access management interface of the approval client 130. The logs, by way of example, may include the following: (1) What is the request under which these operations were performed? (2) What is the operation that was executed? (3) What is the description for the nature of the operation that was executed? and (4) What is the precise timestamp for when each operation was executed? Other variations and combinations of logging features are contemplated with embodiments described herein.

With continued reference to FIG. 2, FIG. 2 includes the access management environment further includes computing environment aspects aligned with access vectors (AV): monitoring tools AV1-202, support center AV1-204, service APIs AV2-206, private access control plane APIs AV2-208, subscription access AV3-210, storage account AV4-212, virtual machine AV4-214, SQL AV4-216, service fabric AV4-218, fabric AV5-220 (with fabric components 225), and distributed services AV6-230 (with distribute service components 235), as discussed in more detail below. The computing environments can be associated with computing environment aspects categorized as computing environments attributes, access provisioning operations, support administrator operations of the provider-controlled or customer-controlled computing environments. At a high level, an access vector can be a computing construct that groups computing environments aspects based on functional categories (e.g., standard development tools, service management plane, access interfaces, infrastructure components) of the distributed computing environment. The computing environments can be associated with computing environment aspects categorized as computing environments attributes, access provisioning operations, support administrator operations of the provider-controlled or customer-controlled computing environments.

By way of example, access vectors (AV): monitoring tools AV1-202 and support center AV1-204 can include tools to streamline debugging and maintaining our services. These tools are may be for customer support and day-to-day tasks with limited access to customer data, as such, access based on AV1 access vectors can be routinely approved without much scrutiny by the customer. The customer can specifically review the computing environments attributes, access provisioning operations, support administrator operations associated with the AV1 access vectors when controlling and visually tracking access to their computing environment.

Service APIs AV2-206 and private access control plane APIs AV2-208 may include APIs that provide high privilege access to their API services including operations that access the Customer Container. Another form of this is internal access to the publicly available control plane APIs. Such tools may be more scrutinized and optionally progressively retired in favor of AV1 tools. Additional access vectors such as subscription access AV3-210 (e.g. host service components), storage account AV4-212, virtual machine AV4-214, SQL AV4-216, service fabric AV4-218, fabric AV5-220 (with fabric components 225), and distributed services AV6-230 (with distribute service components 235) based on their corresponding computing environment aspects to provide additional granular control and visibility to the customer in access provisioning operations. Other variations and combination of computing environment aspects grouped into aspect vectors are contemplated with embodiments described herein.

Figure 3:
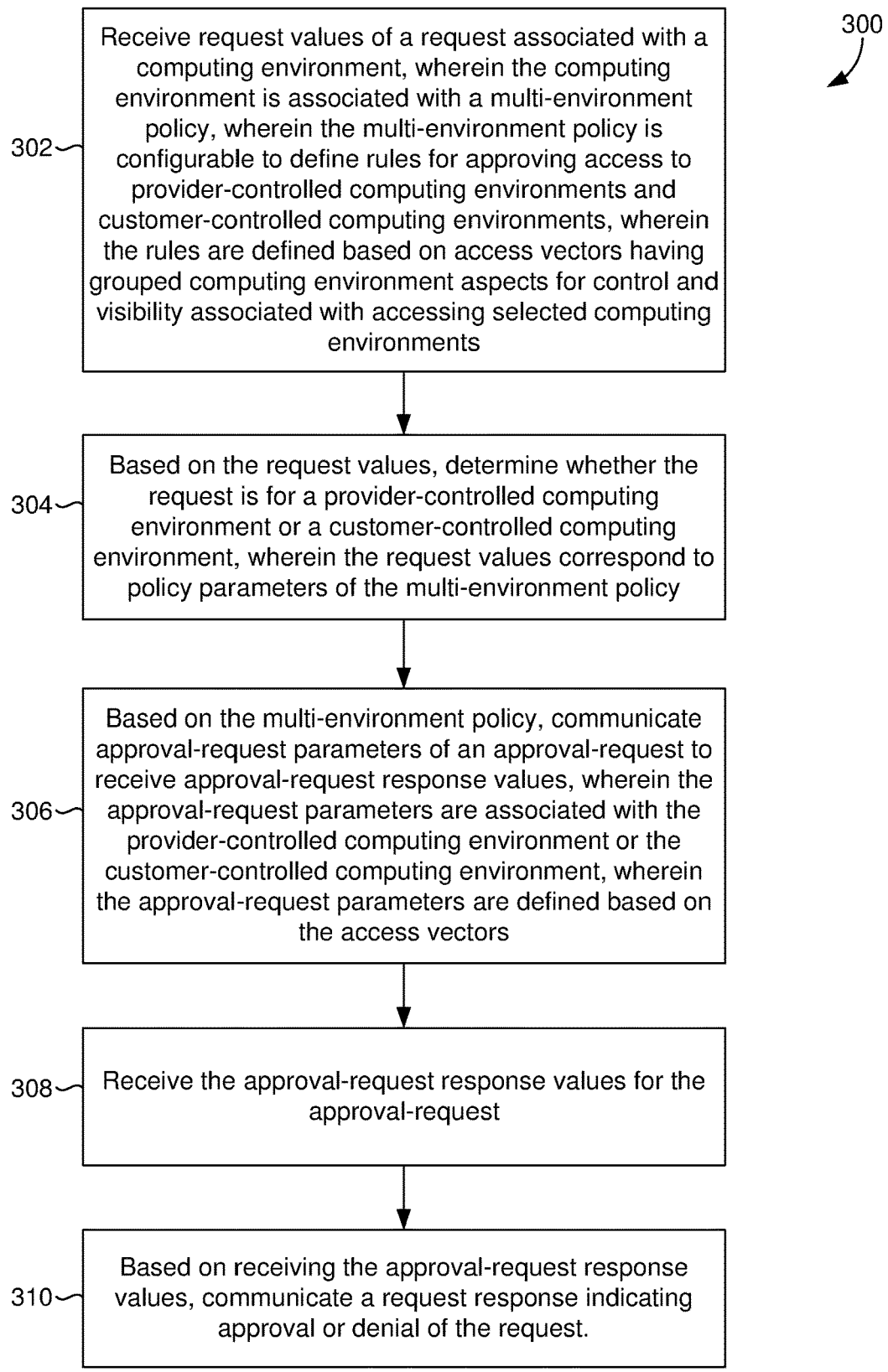
FIG. 3 provides a first exemplary method of providing access management operations using a multi-environment policy in accordance with aspects of the technology described herein.
Figure 4:
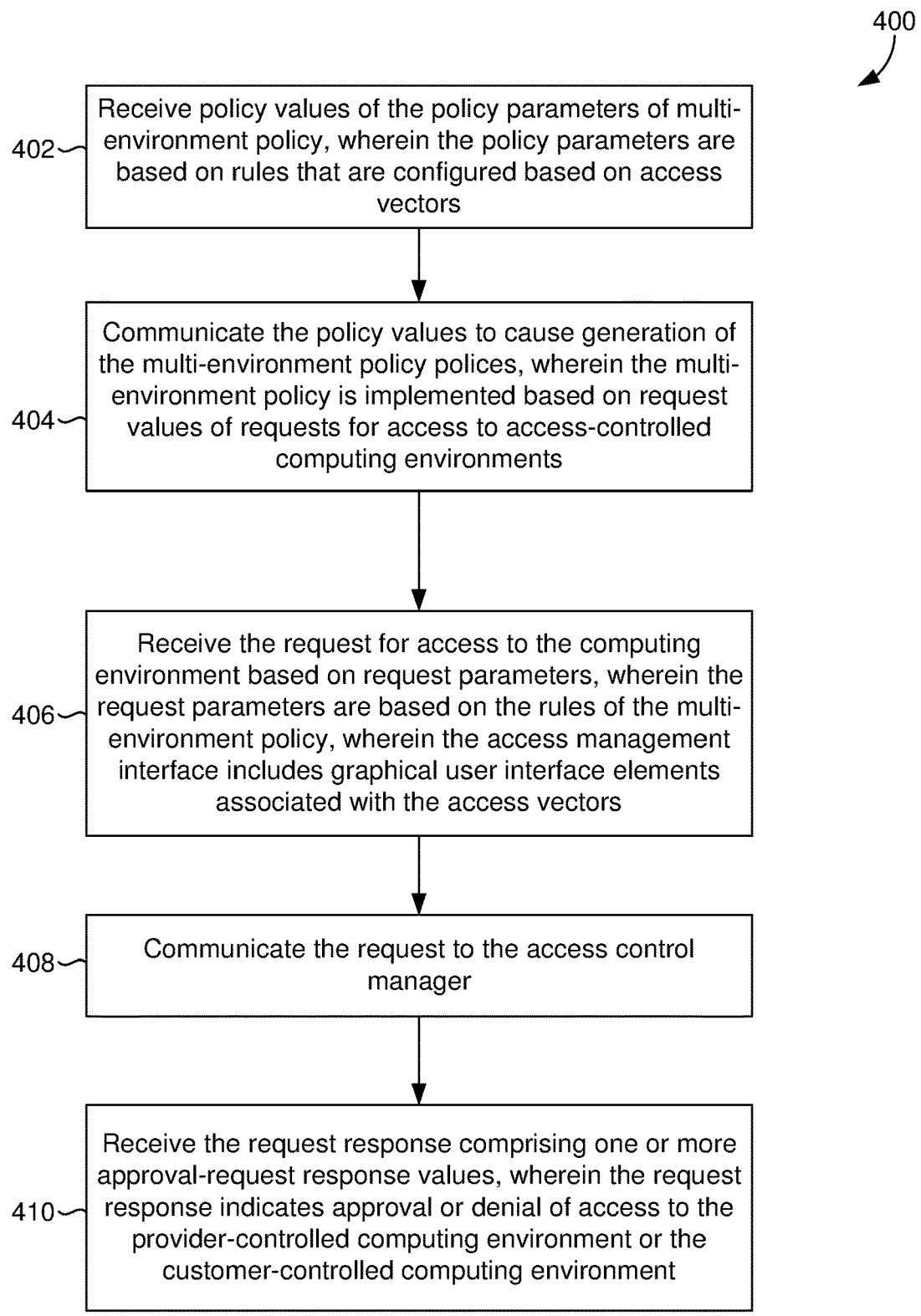
FIG. 4 provides a second exemplary method of providing access management operations using a multi-environment policy, in accordance with aspects of the technology described herein;'
Figure 5:
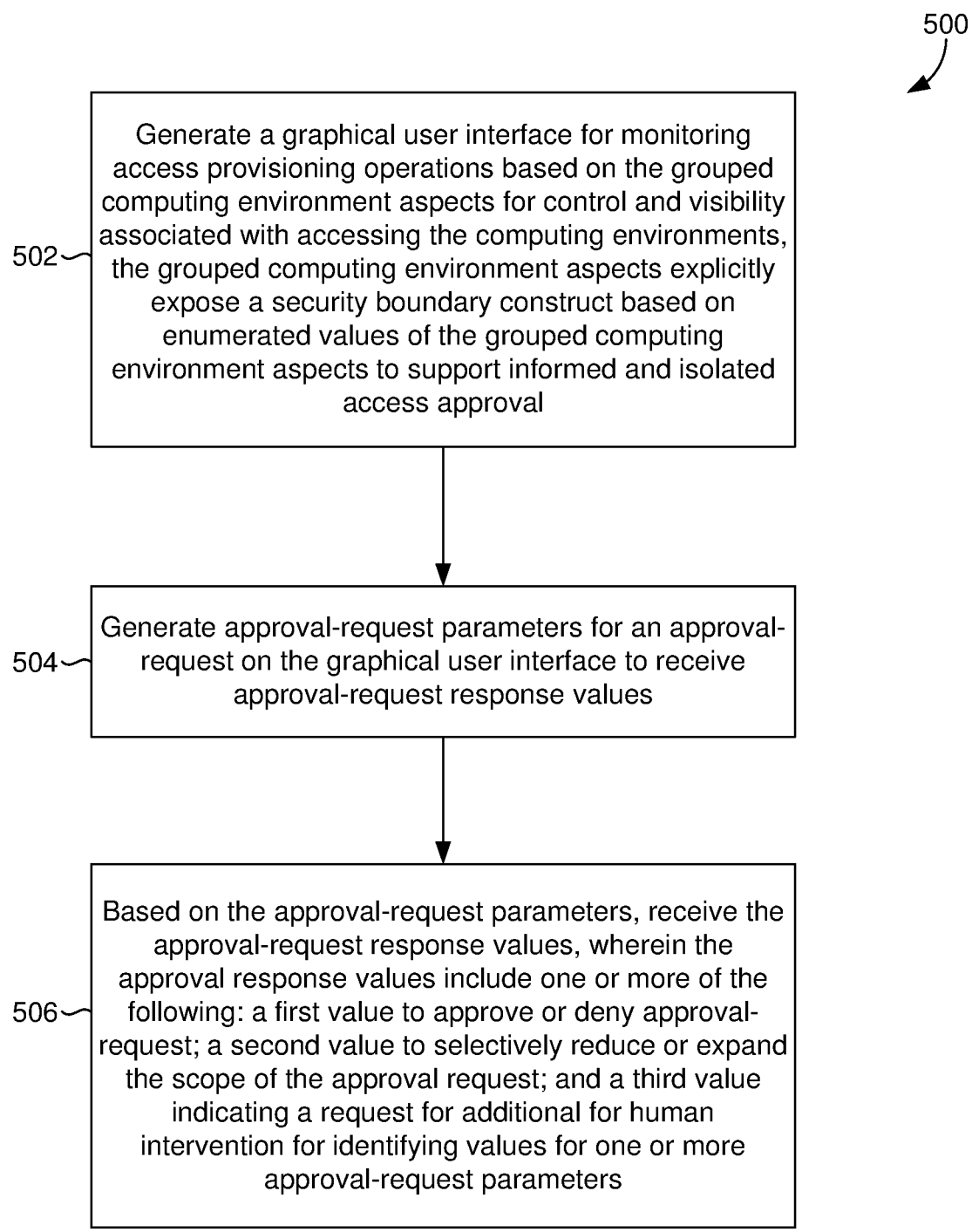
FIG. 5 provides a third exemplary method of providing access management operations using a multi-environment policy, in accordance with aspects of the technology described herein.

Exemplary Methods for Providing Access to Computing Environments Based on a Multi-Environment Policy With reference to FIGS. 3, 4 and 5, flow diagrams are provided illustrating methods for providing access to computing environments based on a multi-environment policy. The methods may be performed using the access management environment described herein. In embodiments, one or more computer storage media having computer-executable instructions embodied thereon that, when executed, by one or more processors can cause the one or more processors to perform methods in the access management environment.

Turning to FIG. 3, a flow diagram is provided that illustrates a method 300 for providing access to computing environments based on a multi-environment policy. Initially at block, 302, request values of a request associated with a computing environment are received. The computing environment is associated with a multi-environment policy. The multi-environment policy is configurable to define rules for granting access to provider-controlled computing environments and customer-controlled computing environments. The rules are defined based on access vectors having grouped computing environment aspects for control and visibility associated with accessing computing environments. At block 304, based on the request values, a determination is made whether the request is for a provider-controlled computing environment or a customer-controlled computing environment. The request values are associated with the multi-environment policy.

At block 306, based on a multi-environment policy, approval-request parameters of an approval-request are communicated to receive approval-request response values. The approval-request parameters are associated with provider-controlled computing environment or the customer-controlled computing environment. The approval-request parameters are selected based on the access vectors. At block 308, the approval-request response values for the approval-request are received. At block 310, based on receiving the approval-request response values, a request response indicating approval or denial of the request is communicated.

Turning to FIG. 4, a flow diagram is provided that illustrates a method 400 for providing access to computing environments based on a multi-environment policy. Initially at block 402, policy values of policy parameters of multi-environment policy policies are received. The policy parameters are based on rules that are configured based on access vectors. At block 404, the policy values are communicated to cause generation of the multi-environment policy. The multi-environment policy is implemented based on request values of requests for access to access-controlled computing environments.

At block 406, the request for access to the computing environment based on request parameters is received at an access management interface. The request parameters are based on the rules of the multi-environment policy. The access management interface includes graphical user interface elements associated with the access vectors. At block 408, the request is communicated to an access control manager. At block 410, the request response comprising one or more approval-request response values is received. The request response indicates approval or denial of access to the provider-controlled computing environment or the customer-controlled computing environment.

Turning to FIG. 5, a flow diagram is provided that illustrates a method 500 providing access to computing environments based on a multi-environment policy. Initially at block 502, a graphical user interface monitoring access provisioning operations based on the grouped computing environment aspects for control and visibility associated with accessing the computing environments. The grouped computing environment aspects explicitly expose a security boundary construct based on enumerated values of the grouped computing environment aspects to support informed and isolated access approval. At block 506, based on the approval-request parameters, the approval-request response values are received. The approval response values include one or more of the following: a first value to approve or deny approval-request; a second value to selectively reduce or expand the scope of the approval request; and a third value indicating a request for additional for human intervention for identifying values for one or more approval-request parameters.

Example Access Management System

Figure 6:
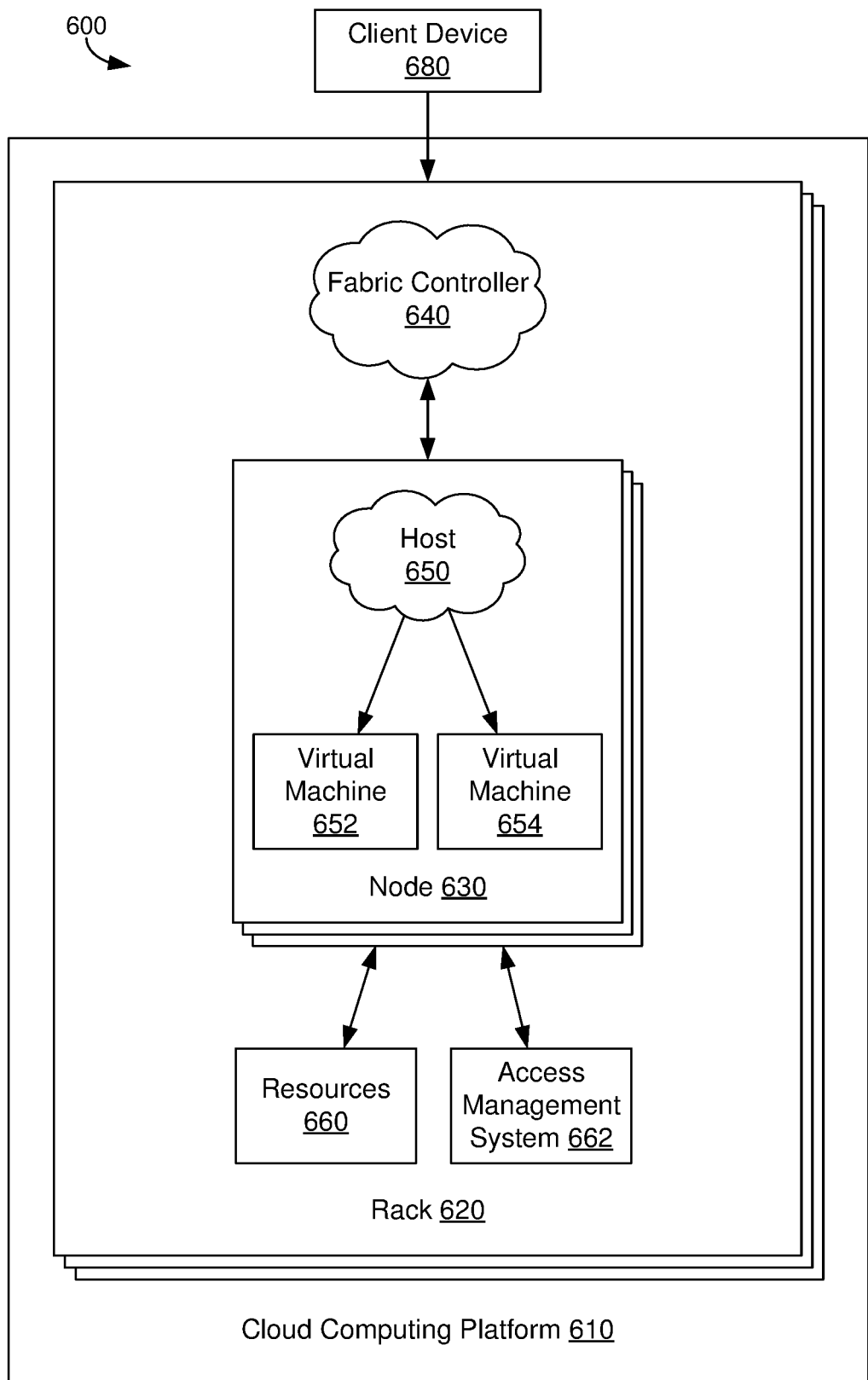
FIG. 6 provides a block diagram of an exemplary distributed computing environment suitable for use in implementing aspects of the technology described herein.

With initial reference the access management system 662 of FIG. 6, at a high level, access management (or access control) can refer to computing security processes and components that provide computer security based on identification, authorization, authentication, access approval, and auditing. An access management system can be implemented in a distributed computing environment to limit access to distributed computing environment resources. The access management system can be specifically implemented as a time-limited controlled access management system (e.g., Just-In-Time "JIT" service). By way of example, a Just-in-Time access management system can be a context-based access management system that provides temporary access to requesters to resources based on security policies. These policies can be designed as an ordered sequence of condition-action rules. When a request is submitted, it is evaluated against applicable rules in sequence and the results of the last matching action are taken to be the result of the policy evaluation. The result involves granting access to a resource with or without human approval or automatically denying the request. The JIT system applies the result, and when an access request is granted, the JIT system monitors the access and once it expires the access is revoked.

Time-limited controlled access can advantageously be used to lock down inbound traffic to virtual machines to reduce exposure to attacks, while providing easy access to virtual machines when needed. By way of example, when access management is enabled for a resource (e.g., VM), an access management system 662 can lock down inbound traffic to the resource by creating a network security group (NSG) rule. The resource, for example, may be a VM and selected ports are locked down and controlled using the access management system 662. As such, when a user requests access to a VM, the access management system 662 (e.g., a security center) checks that the user has a role-based access control permission that permits the user to successfully request to access the VM. If the request is approved, the security center can automatically configures a network security group (e.g., NSG) to allow inbound traffic to a selected port and requested source IP addresses or ranges, for the amount of time that was specified. After the time has ended (or expired), the security center restores the NSGs to previous states, while keeping the connections that are already established uninterrupted.

The access management system can support different types of policies for controlling access to resources. A VM can be configured to operate with a selected policy or group of policies. In an example implementation, when a VM is enabled for access management, the access management system 662 can create a "deny all inbound traffic" for selected ports; however, other manual port settings can also be configured. When requesting access to a VM, a user may identify the ports that the user wants to open and the source IP addresses that the port is opened on and the time window for which the port will be open. The access management system 662 may support requesting access to the ports that are configured in the policy. It is contemplated that each port may have a maximum allowed time derived from the policy.

The access management system 662 can further support auditing access activity by way of a log search. Permissions can be configured to limit access to configuring and use of the access management system 662. The access management system 662 can also optionally be configured programmatically. For example, representational state transfer (REST) APIs can be used to programmatically get information about configured VMs, add new ones, request access to a VM, and more.

Example Distributed Computing Environment

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller component 640 for provisioning and managing resource allocation, deployment, upgrade, and management of cloud services. Typically, cloud computing platform 610 acts to store data or run service applications in a distributed manner. Cloud computing platform 610 in a data center can be configured to host and support operation of endpoints of a particular service application. Cloud computing platform 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and computing device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610 and an access management system 662 (e.g., access control manager). It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but expose as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Operating Environment

Figure 7:
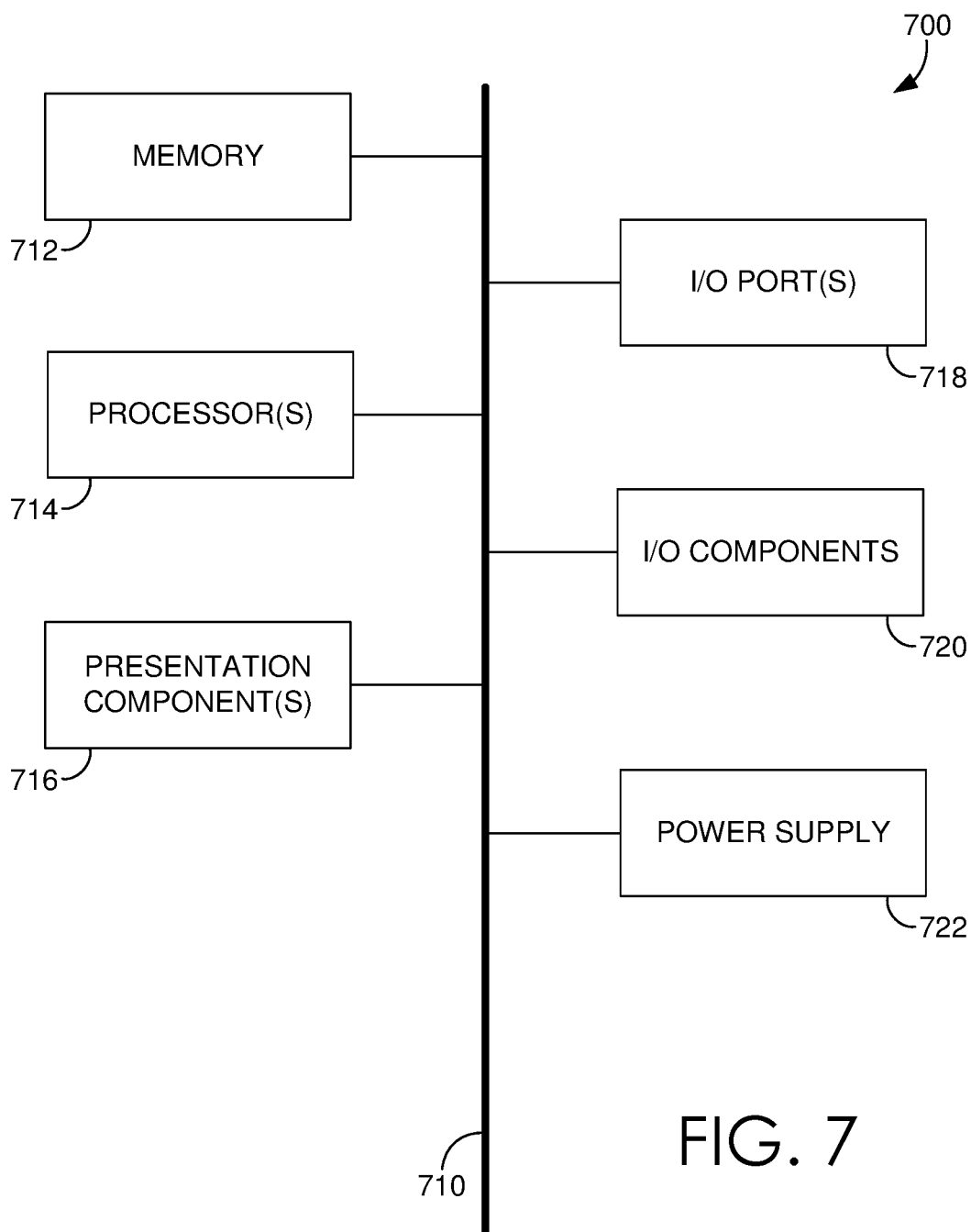
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects herein above set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. An access management system for providing access to computing environments based on a multi-environment policy, the system comprising:

one or more processors; and one or more computer storage media storing computer-useable instructions that, when used by the one or more processors, cause the one or more processors to execute:

an access control manager configured for:

receiving request values of a request associated with a computing environment, wherein the access control manager comprises programmed instructions that define integrated access provisioning operations for combined provisioning of access to provider-controlled computing environments and customer-controlled computing environment;

wherein the integrated access provisioning operations are based on a subscription classification that identifies a controlling subscriber of an identified computing environment;

wherein the computing environment is associated with a plurality of access vectors and the multi-environment policy, wherein an access vector comprises grouped computing environment aspects based on functional categories, the grouped computing environment aspects explicitly expose a security boundary construct based on enumerated values;

wherein the functional categories are associated with corresponding access provisioning operations that are defined and performed for different subscriptions to provide isolated access approval in a distributed computing environment;

wherein the enumerated values comprise different sets of support administrator operations that correspond to the plurality of access vectors;

wherein the multi-environment policy is a single policy configurable to define rules based on the plurality of access vectors for approving access to both provider-controlled computing environments and customer-controlled computing environments, wherein the rules are associated with both provider parameters and customer parameters for accessing selected computing environments;

based on the request values, determining whether the request is for a provider-controlled computing environment associated with the provider parameters of the plurality of access vectors or a customer-controlled computing environment associated with customer parameters of the plurality of access vectors, wherein the request values correspond to policy parameters of the multi-environment policy;

based on the multi-environment policy, communicating approval-request parameters of an approval-request to receive approval-request response values, wherein the approval-request parameters are associated with the provider-controlled computing environment or the customer-controlled computing environment, wherein the approval-request parameters are defined based on the plurality of access vectors;

receiving the approval-request response values for the approval-request; and based on receiving the approval-request response values, communicating a request response indicating approval or denial of the request.

2. The system of claim 1, further comprising an access management interface configured for:

receiving policy values of the policy parameters of the multi-environment policy, wherein the policy parameters are based on the rules that are configured based on the plurality of access vectors;

communicating the policy values to cause generation of the multi-environment policy, wherein the multi-environment policy is implemented based on submitted request values of requests for access to computing environments;

receiving the request for access to the computing environment based on request parameters, wherein the request parameters are based on the rules associated with the multi-environment policy, wherein the access management interface includes graphical user interface elements associated with the plurality of access vectors;

communicating the request to the access control manager; and receiving the request response comprising one or more approval-request response values, wherein the request response indicates approval or denial of access to the provider-controlled computing environment or the customer-controlled computing environment.

3. The system of claim 1, wherein the subscription classification corresponds to one of the following identifiers: a customer subscription identifier, a provider subscription identifier, or other subscription identifier.

4. The system of claim 1, wherein an access vector includes a tag indicating a type of access to customer data associated with the access vector.

5. The system of claim 1, wherein the grouped computing environment aspects explicitly expose the security boundary construct based on the enumerated values of the grouped computing environment aspects for control and visibility to support informed and isolated access approval.

6. The system of claim 1, further comprising an approval manager configured for:

generating a graphical user interface for monitoring access provisioning operations based on the grouped computing environment aspects for control and visibility associated with accessing the computing environments.

7. The system of claim 1, further comprising an approval manager configured for:

based on the approval-request parameters, receiving approval-request response values, where the approval response values include one or more of the following:

a first value to approve or deny the approval-request;

a second value to selectively reduce or expand the scope of the approval request; and a third value to indicate a request for human intervention for identifying additional values for one or more approval-request parameters.

8. One or more computer storage media having computer-executable instructions embodied thereon that, when executed, by one or more processors, cause the one or more processors to perform a method for providing access to computing environments based on a multi-environment policy, the method comprising:

receiving request values of a request associated with a computing environment, wherein the access control manager comprises programmed instructions that define integrated access provisioning operations for combined provisioning of access to provider-controlled computing environments and customer-controlled computing environment;

wherein the integrated access provisioning operations are based on a subscription classification that identifies a controlling subscriber of an identified computing environment;

wherein the computing environment is associated with a plurality of access vectors and the multi-environment policy, wherein an access vector comprises grouped computing environment aspects based on functional categories, the grouped computing environment aspects explicitly expose a security boundary construct based on enumerated values;

wherein the functional categories are associated with corresponding access provisioning operations that are defined and performed for different subscriptions to provide isolated access approval in a distributed computing environment;

wherein the enumerated values comprise different sets of support administrator operations that correspond to the plurality of access vectors;

wherein the multi-environment policy is a single policy configurable to define rules based on the plurality of access vectors for approving access to both provider-controlled computing environments and customer-controlled computing environments, wherein the rules are associated with both provider parameters and customer parameters for accessing selected computing environments;

based on the request values, determining whether the request is for a provider-controlled computing environment associated with the provider parameters of the plurality of access vectors or a customer-controlled computing environment associated with customer parameters of the plurality of access vectors, wherein the request values correspond to policy parameters of the multi-environment policy;

based on the multi-environment policy, communicating approval-request parameters of an approval-request to receive approval-request response values, wherein the approval-request parameters are associated with the provider-controlled computing environment or the customer-controlled computing environment, wherein the approval-request parameters are defined based on the plurality of access vectors;

receiving the approval-request response values for the approval-request; and based on receiving the approval-request response values, communicating a request response indicating approval or denial of the request.

9. The media of claim 8, the method further comprising:

receiving policy values of the policy parameters of the multi-environment policy, wherein the policy parameters are based on the rules that are configured based on the plurality of access vectors;

communicating the policy values to cause generation of the multi-environment policy, wherein the multi-environment policy is implemented based on submitted request values of requests for access to computing environments;

receiving the request for access to the computing environment based on request parameters, wherein the request parameters are based on the rules associated with the multi-environment policy, wherein the access management interface includes graphical user interface elements associated with the plurality of access vectors;

communicating the request to the access control manager; and receiving the request response comprising one or more approval-request response values, wherein the request response indicates approval or denial of access to the provider-controlled computing environment or the customer-controlled computing environment.

10. The media of claim 8, wherein the subscription classification corresponds to one of the following identifiers: a customer subscription identifier, a provider subscription identifier, or other subscription identifier.

11. The media of claim 8, wherein an access vector includes a tag indicating a type of access to customer data associated with the access vector.

12. The media of claim 8, wherein the grouped computing environment aspects explicitly expose the security boundary construct based on the enumerated values of the grouped computing environment aspects for control and visibility to support informed and isolated access approval.

13. The media of claim 8, the method further comprising:

generating a graphical user interface for monitoring access provisioning operations based on the grouped computing environment aspects for control and visibility associated with accessing the computing environments.

14. The media of claim 8, the method further comprising:

based on the approval-request parameters, receiving approval-request response values, where the approval response values include one or more of the following:

a first value to approve or deny the approval-request;

a second value to selectively reduce or expand the scope of the approval request; and a third value to indicate a request for human intervention for identifying additional values for one or more approval-request parameters.

15. A computer-implemented method for providing access to computing environments based on a multi-environment policy, the method comprising:

receiving request values of a request associated with a computing environment, wherein the access control manager comprises programmed instructions that define integrated access provisioning operations for combined provisioning of access to provider-controlled computing environments and customer-controlled computing environment;

wherein the integrated access provisioning operations are based on a subscription classification that identifies a controlling subscriber of an identified computing environment;

wherein the computing environment is associated with a plurality of access vectors and the multi-environment policy, wherein an access vector comprises grouped computing environment aspects based on functional categories, the grouped computing environment aspects explicitly expose a security boundary construct based on enumerated values;

wherein the functional categories are associated with corresponding access provisioning operations that are defined and performed for different subscriptions to provide isolated access approval in a distributed computing environment;

wherein the enumerated values comprise different sets of support administrator operations that correspond to the plurality of access vectors;

wherein the multi-environment policy is a single policy configurable to define rules based on the plurality of access vectors for approving access to both provider-controlled computing environments and customer-controlled computing environments, wherein the rules are associated with both provider parameters and customer parameters for accessing selected computing environments;

based on the request values, determining whether the request is for a provider-controlled computing environment associated with the provider parameters of the plurality of access vectors or a customer-controlled computing environment associated with customer parameters of the plurality of access vectors, wherein the request values correspond to policy parameters of the multi-environment policy;

based on the multi-environment policy, communicating approval-request parameters of an approval-request to receive approval-request response values, wherein the approval-request parameters are associated with the provider-controlled computing environment or the customer-controlled computing environment, wherein the approval-request parameters are defined based on the plurality of access vectors;

receiving the approval-request response values for the approval-request; and based on receiving the approval-request response values, communicating a request response indicating approval or denial of the request.

16. The method of claim 15, wherein the subscription classification corresponds to one of the following identifiers: a customer subscription identifier, a provider subscription identifier, or other subscription identifier.

17. The method of claim 15, wherein an access vector includes a tag indicating a type of access to customer data associated with the access vector.

18. The method of claim 15, wherein the grouped computing environment aspects explicitly expose the security boundary construct based on the enumerated values of the grouped computing environment aspects for control and visibility to support informed and isolated access approval.

19. The method of claim 15, the method further comprising:

generating a graphical user interface for monitoring access provisioning operations based on the grouped computing environment aspects for control and visibility associated with accessing the computing environments.

20. The method of claim 15, the method further comprising:

based on the approval-request parameters, receiving approval-request response values, where the approval response values include one or more of the following:

a first value to approve or deny the approval-request;

a second value to selectively reduce or expand the scope of the approval request; and a third value to indicate a request for human intervention for identifying additional values for one or more approval-request parameters.

* * * * *